UNITED STATES PATENT OFFICE.

IRVING B. SNELL, OF PHILADELPHIA, PENNSYLVANIA.

PROCESS OF COLORING PHOTOGRAPHS.

SPECIFICATION forming part of Letters Patent No. 291,544, dated January 8, 1884.

Application filed July 12, 1883. (Specimens.)

*To all whom it may concern:*

Be it known that I, IRVING B. SNELL, a citizen of the United States, residing at Philadelphia, in the county of Philadelphia and State of Pennsylvania, have invented certain Improvements in Coloring Photographs and the Like; and I do hereby declare the following to be a full and exact description thereof.

My invention consists, first, in preparing colors to be used in coloring photographs, lithographs, stereoscopic views, steel engravings, wood-cuts, and which may be applied to all kinds of pictures upon paper; second, in the method of applying the colors to the picture; and, third, in pasting the pictures upon glass, when so desired.

The basis of the colors which I use are the dyes known in commerce as the "Diamond Package" dyes, which can be had in all colors, or which, by being mixed, can produce any shade desired. These dyes I use to give the colors to the paints; but without being prepared as I prepare them they are inapplicable to be used as paints, they in their normal condition being used only as dyes. For making the paints which I use in coloring pictures, I first dissolve the dyes in cold water, enough water being used to hold them in solution, and then add a boiling mixture of water and alcohol, to which has previously been added a small quantity of gum-arabic and powdered white sugar. The mixture of alcohol and water should be one part of alcohol to three parts of water, or thereabout. To indicate about the proper quantity of the ingredients used, to one package (about one ounce) of the dye one-half gallon of the mixture of water and alcohol should be used, to which has previously been added a tablespoonful of white sugar and two table-spoonfuls of gum-arabic. These proportions can be varied somewhat without materially altering the character of the paint. Instead of alcohol, acetic acid, oxalic acid, or vinegar might be used; but they are inferior to the alcohol. For a paint which can be used with very good results, I sometimes simply dissolve the dye in cold water, and then add sufficient boiling-hot water to give a deep color. The adding of the hot water I find makes a permanent paint of the dye. If simply cold water is used, the dyes will in time be entirely deposited as sediment, and a rule for determining the strength of the compound is to observe when all of the dye is held in solution by the hot water. A paint thus formed gives very good results; but I find that in the hands of an unskillful person the color will "crawl," and this can only be prevented, even in the hands of an experienced person, by great care. After many experiments in trying to obviate this difficulty, I have discovered that the addition of a small quantity of gum-arabic and sugar will entirely do away with this "crawling." The addition of the alcohol serves to set the colors, and also helps to make them permanent. The colors thus formed have a brightness and give a life-like effect, such as I have never observed in pictures colored by other means, although I have been engaged in the business of coloring photographs for a long term of years, and am familiar with all the processes which have been in use; and I have never been able to detect the slightest degree of fading in any of the pictures upon which I have experimented with these colors.

In applying these colors to photographs or pictures on paper, I first coat the photograph or other picture with a wash composed of gum-arabic, water, and pulverized white sugar. Proper proportions of the ingredients are: to two table-spoonfuls of gum-arabic add six ounces of water and one tea-spoonful of sugar. Then the colors are applied, preferably with a brush, and the picture is sponged off and another coating of the gum-arabic and sugar applied. If the paper is to be pasted onto glass, the second coating of gum-arabic and sugar is dispensed with, and the paper pasted onto the glass by a paste composed of one tea-spoonful of corn-starch and two sheets (about one-half ounce) of transparent gelatine mixed with six ounces of water.

The Diamond Package dyes which form the basis of the colors which I employ are well-known articles of commerce, and it is believed that their composition is a secret known only to the manufacturers thereof.

What I claim as my invention is—

1. The process of coloring photographs and other pictures upon paper, which consists of the following steps: first, coating the picture with a wash composed of gum-arabic, sugar, and water; second, applying colors composed of Diamond Package dyes dissolved in cold and hot water; and, third, coating the picture with a wash composed of gum-arabic, sugar, and water, substantially as set forth.

2. The process of coloring photographs and other pictures upon paper, which consists of the following steps: first, coating the picture with a wash composed of gum-arabic, sugar, and water; second, applying colors composed of Diamond Package dyes dissolved in cold water, to which is added a solution of gum-arabic and sugar in a mixture of hot water and alcohol, or its equivalent; and, third, coating the picture with a wash composed of gum-arabic, sugar, and water, substantially as set forth.

3. The process of coloring photographs and other pictures upon paper and pasting the same upon glass, which consists of the following steps: first, coating the picture with a wash composed of gum-arabic, sugar, and water; second, applying colors composed of Diamond Package dyes dissolved in cold and hot water; and, third, pasting the picture upon glass with a paste composed of corn-starch, transparent gelatine, and water, substantially as set forth.

4. The process of coloring photographs and other pictures upon paper and pasting the same upon glass, which consists of the following steps: first, coating the picture with a wash composed of gum-arabic, sugar, and water; second, applying colors composed of Diamond Package dyes dissolved in cold water, to which is added a solution of gum-arabic and sugar in a mixture of hot water and alcohol, or its equivalent; and, third, pasting the picture upon glass with a paste composed of corn-starch, transparent gelatine, and water, substantially as set forth.

5. The process of preparing colors to be used in coloring photographs and the like, which consists in first dissolving Diamond Package dyes in cold water, and then adding a solution of gum-arabic and sugar in a mixture of hot water and alcohol, or its equivalent, substantially as set forth.

IRVING B. SNELL.

Witnesses:
A. S. BROWN,
W. E. WITHERBEE.